(12) United States Patent
Matsuda

(10) Patent No.: US 7,630,627 B2
(45) Date of Patent: Dec. 8, 2009

(54) VIEWFINDER OPTICAL SYSTEM AND IMAGE PICKUP APPARATUS INCLUDING THE SAME

(75) Inventor: Takaho Matsuda, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 11/745,075

(22) Filed: May 7, 2007

(65) Prior Publication Data

US 2007/0286594 A1    Dec. 13, 2007

(30) Foreign Application Priority Data

Jun. 8, 2006    (JP) ............................. 2006-159657
Mar. 1, 2007    (JP) ............................. 2007-051575

(51) Int. Cl.
G03B 13/06    (2006.01)

(52) U.S. Cl. .................. 396/384; 359/726; 348/333.08

(58) Field of Classification Search ................ 396/384; 359/726; 348/333.08
See application file for complete search history.

(56) References Cited

U.S. PATENT DOCUMENTS

2001/0054988 A1*    12/2001    Cone et al. .................... 345/7

FOREIGN PATENT DOCUMENTS

JP    2000-356799 A    12/2000
JP    2001-311881 A    11/2001

OTHER PUBLICATIONS

Sato, Yasuhisa (JP Publication No. 2000-356799): Finder, Dec. 26, 2000.*
Ishii, Masatoshi (JP Publication No. 2001-311881): Finder Optical System, Nov. 9, 2001.*

* cited by examiner

*Primary Examiner*—Christopher E Mahoney
*Assistant Examiner*—Fang-Chi Chang
(74) *Attorney, Agent, or Firm*—Canon U.S.A., Inc., IP Division

(57) ABSTRACT

At least one exemplary embodiment is directed to a viewfinder optical system which includes a first mirror having a roof shape configured to reflect light from an object image formed by a photographic lens towards the object image, a second mirror configured to reflect light reflected from the first mirror towards an observation side, and an eyepiece lens configured to receive light reflected from the second mirror. The second mirror includes a rotationally asymmetrical surface. The eyepiece lens includes at least one rotationally asymmetrical surface. The eyepiece lens includes a plurality of lenses, among which a lens closest to the second mirror includes a rotationally asymmetrical surface.

4 Claims, 7 Drawing Sheets

VIEWFINDER OPTICAL SYSTEM AND IMAGE PICKUP APPARATUS INCLUDING THE SAME

BACKGROUND OF THE INVENTION

1. Field of the Invention

The present invention relates to a viewfinder optical system. More particularly, though not exclusively, the present invention can be applicable to an image pickup apparatus such as a single-lens reflex camera.

2. Description of the Related Art

A single-lens reflex camera includes a photographic lens that forms a viewfinder image (i.e., an object image) on a focusing screen and a viewfinder optical system that enables a user to observe the image. The viewfinder optical system includes an image inverting unit (e.g., a pentagonal prism) configured to convert a viewfinder image formed on a focusing screen into an erected image. Furthermore, the viewfinder optical system includes an eyepiece lens configured to enlarge the erected image.

Typically it is desirable in the market that an eyepiece lens of a viewfinder optical system has a high observation magnification (or viewfinder magnification), a sufficiently long eye relief, a diopter adjusting function, and higher optical performances.

In general, the observation magnification of a viewfinder optical system can be defined as the ratio of the focal length of a photographic lens to the focal length of an eyepiece lens. For example, as the focal length of an eyepiece lens is short, the observation magnification is large. However, a viewfinder optical system for a single-lens reflex camera has a diopter fixed to a standard diopter (=approximately −1 diopter). Therefore, if the distance between the focusing screen and the eyepiece lens (more specifically, an optical path length to the principal point position of the eyepiece lens) is determined, the focal length of the eyepiece lens is substantially determined.

Hence, if a pentagonal prism has a short optical path length to shorten the distance between the focusing screen and the eyepiece lens, the eye-point of the viewfinder optical system shifts toward the object side compared to the rear surface of the camera. Thus, the eye relief becomes shorter. The eye relief is defined by a distance between the exit surface of the eyepiece lens and a pupil (eye-point) of an observer.

The pentagonal prism can be replaced with a pentagonal roof mirror, which is useful in light weight and low cost. However, a viewfinder optical system including a pentagonal roof mirror has a long air-equivalent optical path length compared to a viewfinder optical system including a pentagonal prism. Therefore, the use of a pentagonal roof mirror is not effective to enlarge the observation magnification.

As discussed in Japanese Patent Application Laid-open No. 2001-311881, an eyepiece lens for a viewfinder optical system including a pentagonal roof mirror can include three lens units, i.e., a negative lens, a positive lens, and a negative lens, which are disposed in order from the object side to the observation side. The viewfinder optical system allows a user to perform diopter movement by moving a part of the lens units along an optical axis.

As discussed in Japanese Patent Application Laid-open No. 2000-356799, a viewfinder optical system including a pentagonal roof mirror can obtain a higher observation magnification when a part of mirrors constituting the pentagonal roof mirror has a focal optical power.

Recent digital single-lens reflex cameras can be equipped with an image sensor comparable to the Advanced Photo System type-C (APS-C) size which is capable of providing an image circle smaller than that of 35 mm silver-halide film.

According to a single-lens reflex camera, a viewfinder image to be observed via a viewfinder optical system is equivalent to an object image formed on an imaging plane. Therefore, a viewfinder image in the single-lens reflex camera is smaller compared to a viewfinder image observed in a conventional camera for 35 mm silver-halide film.

A larger observation magnification can be obtained by increasing the number of lens elements constituting an eyepiece lens. However, the viewfinder optical system becomes complicated in structure.

Furthermore, the viewfinder magnification can be increased if a pentagonal roof mirror has a focal optical power. However, maintaining higher optical performances is required. Adequately correcting decentration aberrations is also required to perform diopter movement.

SUMMARY OF THE INVENTION

Exemplary embodiments of the present invention are directed to a viewfinder optical system that has advanced optical performances and a large observation magnification, enables a user to observe a large viewfinder image, and assures a sufficiently long eye relief. Exemplary embodiments are also directed to an image pickup apparatus including the viewfinder optical system.

According to an aspect of at least one exemplary embodiment of the present invention, a viewfinder optical system includes a first mirror having a roof shape configured to reflect light from an object image formed by a photographic lens towards the object image, a second mirror configured to reflect light reflected from the first mirror towards an observation side, and an eyepiece lens configured to receive light reflected from the second mirror. The second mirror includes a rotationally asymmetrical surface. The eyepiece lens includes at least one rotationally asymmetrical surface. The eyepiece lens includes a plurality of lenses, among which a lens closest to the second mirror includes a rotationally asymmetrical surface.

According to another aspect of at least one exemplary embodiment of the present invention the present invention, an image pickup apparatus includes the above-described viewfinder optical system and an image pickup unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features of the invention and, together with the description, serve to explain at least some of the principles of the invention.

DETAILED DESCRIPTION OF THE EMBODIMENTS

Figure 1:
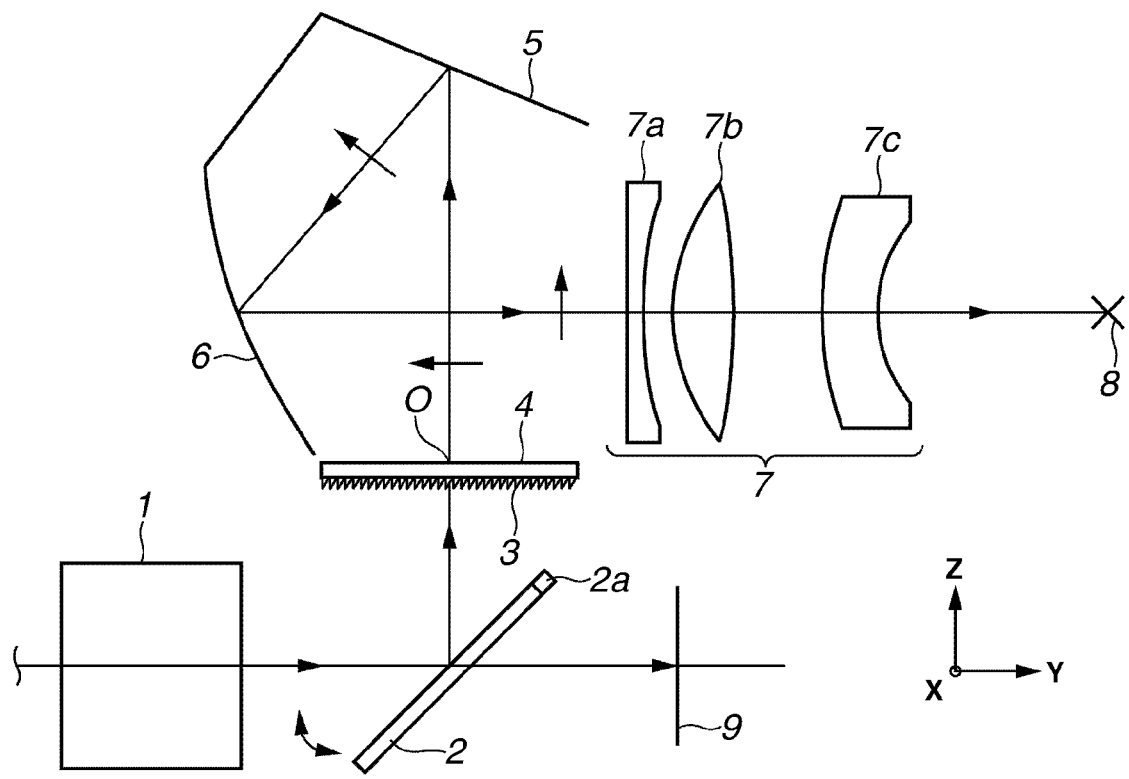
FIG. 1 is a cross-sectional diagram illustrating a single-lens reflex camera including a viewfinder optical system according to an exemplary embodiment of the present invention.

The following description of exemplary embodiments is merely illustrative in nature and is in no way intended to limit the invention, its application, or uses.

It is noted that throughout the specification, similar reference numerals and letters refer to similar items in the following figures, and thus once an item is described in one figure, it may not be discussed for following figures.

Various exemplary embodiments will be described in detail below with reference to the drawings.

FIG. 1 illustrates a digital single-lens reflex camera including a viewfinder optical system according to an exemplary embodiment.

Figure 2:
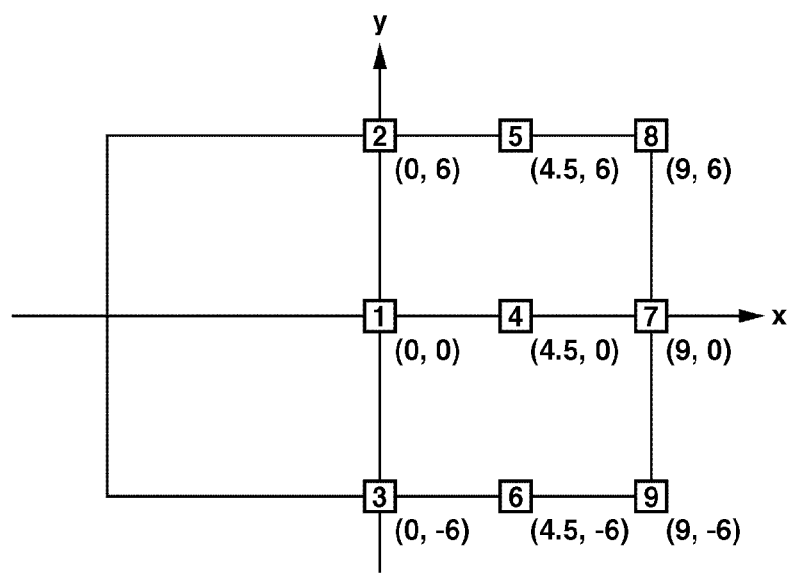
FIG. 2 is a graph illustrating definition of an optical system according to an exemplary embodiment of the present invention.

FIG. 2 illustrates coordinates used for describing various aberrations of an object image observed by the viewfinder optical system according to an exemplary embodiment with reference to the position coordinates on a focusing screen.

Figure 3:
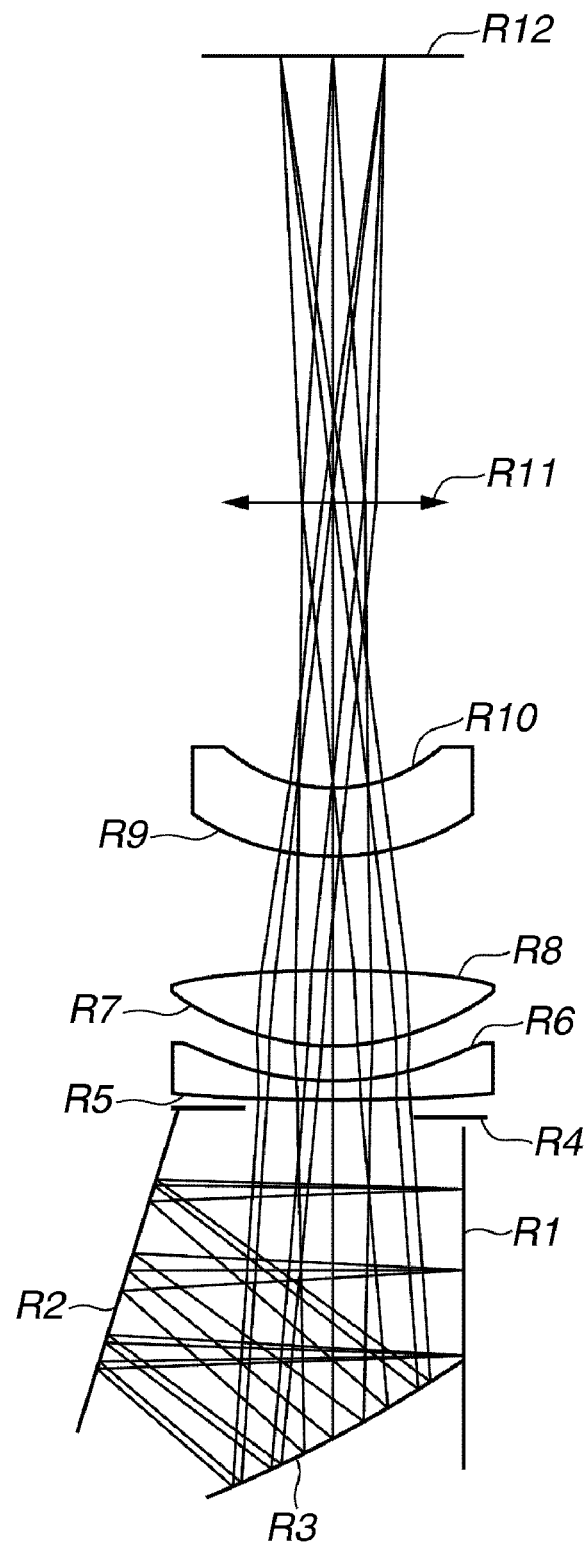
FIG. 3 illustrates exemplary optical paths of a viewfinder optical system according to numerical example 1 of the present invention.
Figure 4:
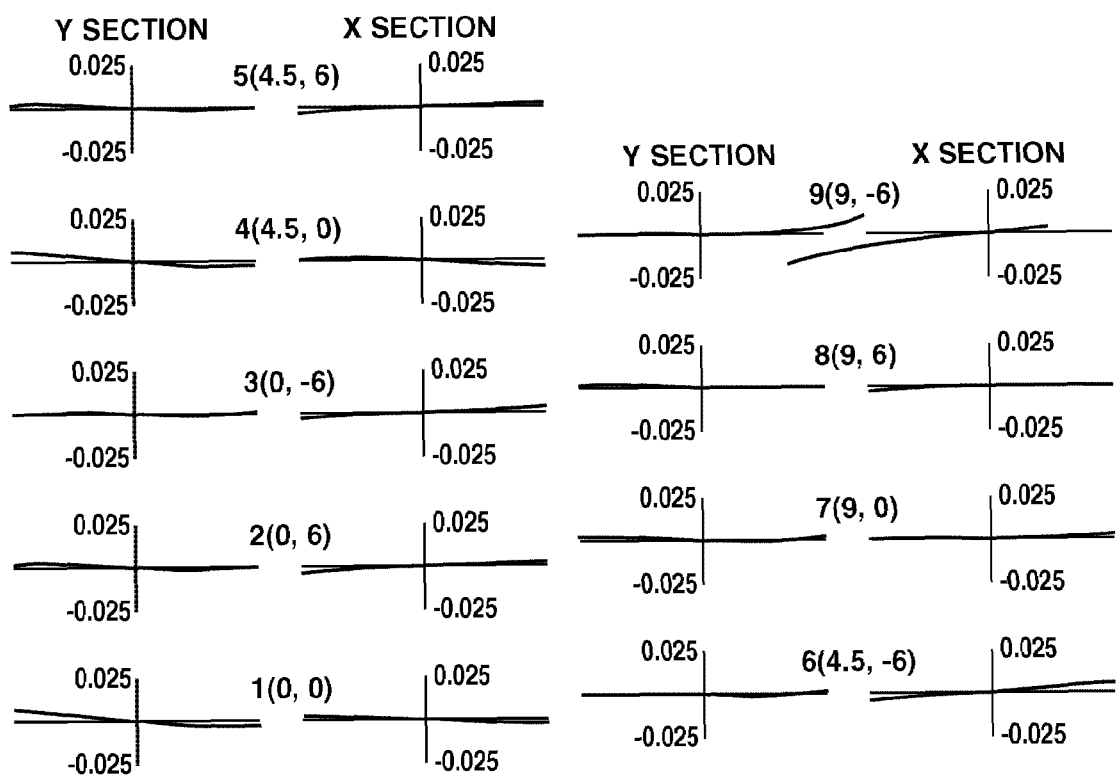
FIG. 4 illustrates aberrations of the viewfinder optical system according to numerical example 1 of an exemplary embodiment of the present invention.

FIGS. 3 and 4 respectively illustrate exemplary optical paths and aberrations of a viewfinder optical system according to numerical example 1.

Figure 5:
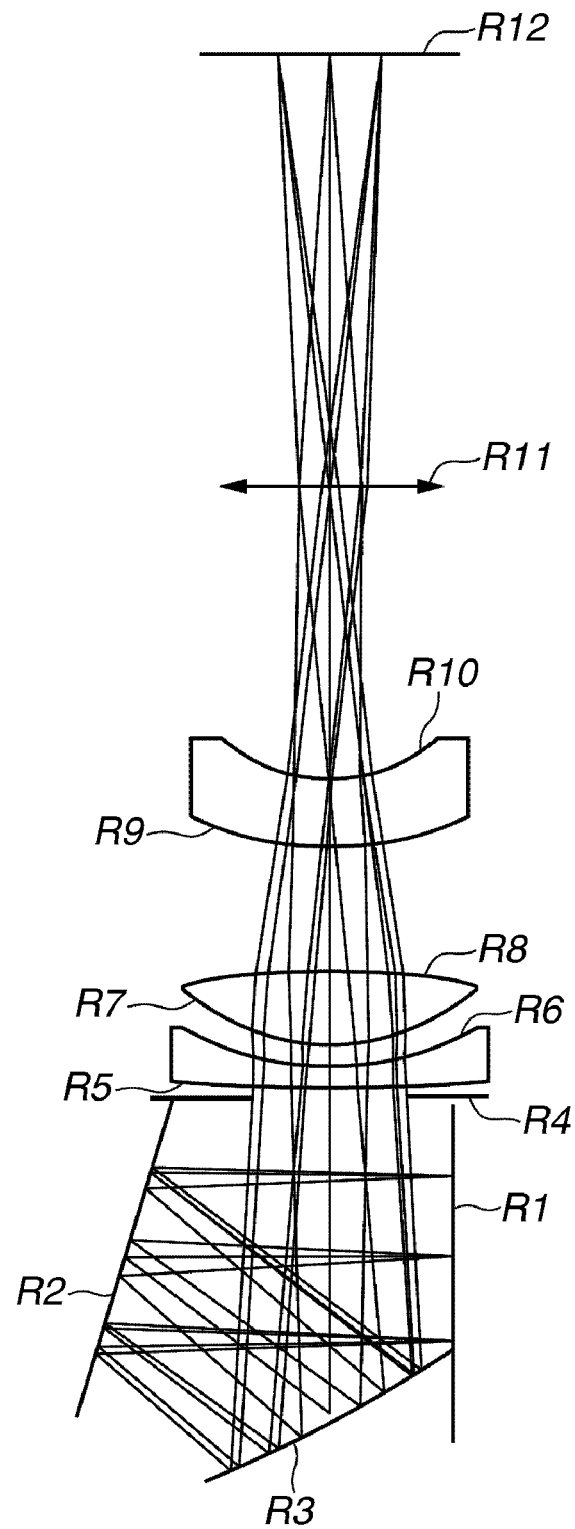
FIG. 5 illustrates exemplary optical paths of a viewfinder optical system according to numerical example 2 of an exemplary embodiment of the present invention.
Figure 6:
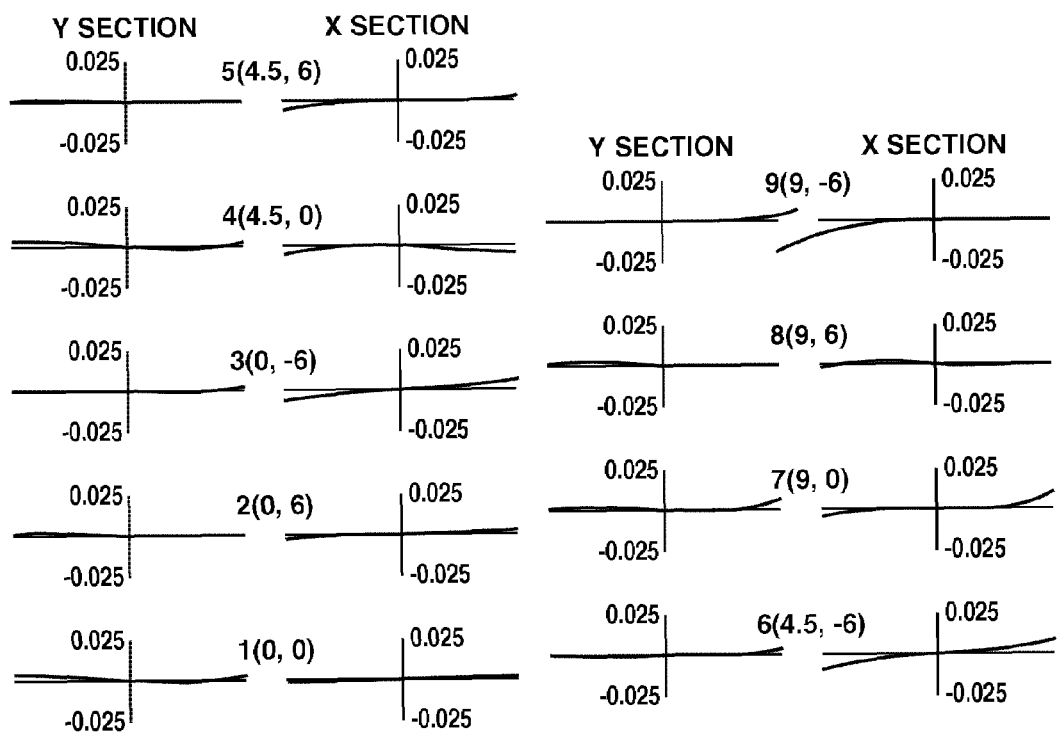
FIG. 6 illustrates aberrations of the viewfinder optical system according to numerical example 2 of an exemplary embodiment of the present invention.

FIGS. 5 and 6 respectively illustrate exemplary optical paths and aberrations of a viewfinder optical system according to numerical example 2.

Figure 7:
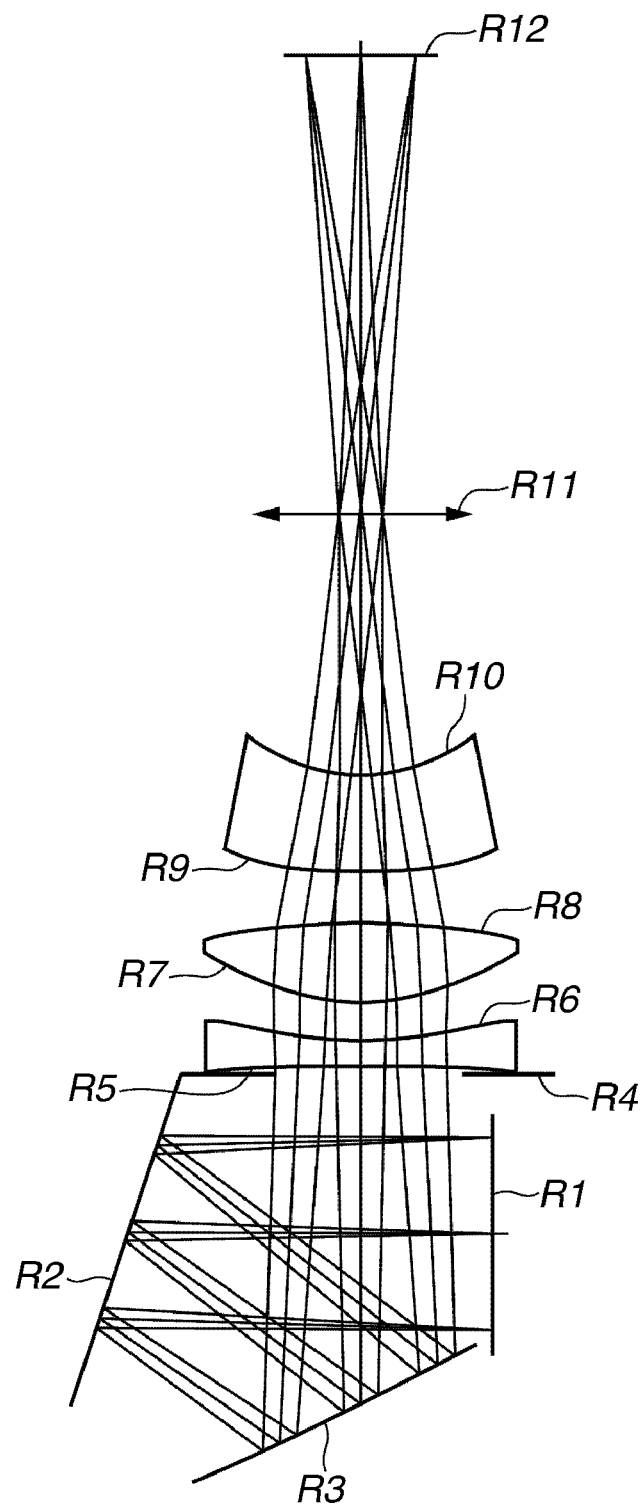
FIG. 7 illustrates exemplary optical paths of a viewfinder optical system according to numerical example 3 of an exemplary embodiment of the present invention.
Figure 8:
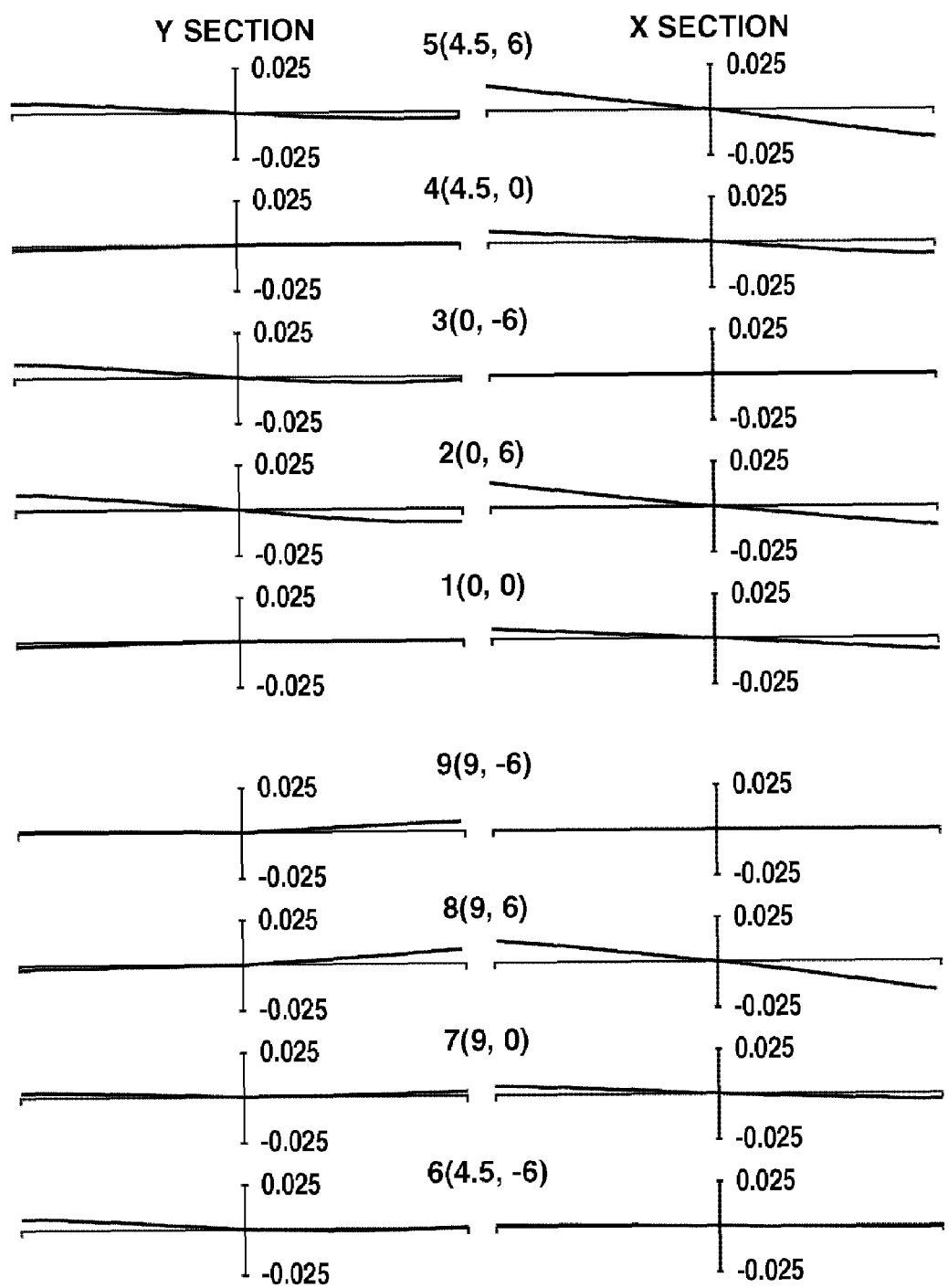
FIG. 8 illustrates aberrations of the viewfinder optical system according to numerical example 3 of an exemplary embodiment of the present invention.

FIGS. 7 and 8 respectively illustrate exemplary optical paths and aberrations of a viewfinder optical system according to numerical example 3.

The optical paths and aberrations illustrated in FIGS. 3 through 8 are examples obtained when the diopter is a standard diopter (=approximately −1 diopter). Furthermore, these examples can be obtained with an image formed at an eye-point 8 by an ideal lens having a focal length of approximately 32 mm and having no aberration. The wavelength is represented by d line.

FIGS. 4, 6, and 8 illustrate exemplary transverse aberrations in the Y section and the X section in each coordinate on a focusing screen 4 illustrated in FIG. 2. The ordinate axis represents a length or distance (mm), and the abscissa axis represents the height of light at the eye-point 8.

The digital single-lens reflex camera illustrated in FIG. 1 includes a photographic lens 1 configured to be mounted on a camera body (not shown), a quick-return mirror 2 which is swingable about a rotary axis 2a so that the light can travel upward after having passed through the photographic lens 1 in a non-shooting mode, a Fresnel lens 3, a focusing screen (i.e., matte surface) 4 on which an object image (viewfinder image) can be formed by the photographic lens 1.

Furthermore, the digital single-lens reflex camera illustrated in FIG. 1 includes a first mirror 5 having a roof shape (i.e., pentagonal roof mirror), a second mirror 6, and an eyepiece lens 7. The first mirror 5 is configured to reflect light from an object image formed on the focusing screen 4 towards the object image. The second mirror 6 is configured to reflect light reflected from the first mirror 5 towards an observation side (i.e., the eye-point 8).

The second mirror 6 according to the present exemplary embodiment has a rotationally asymmetrical surface. The first mirror 5 and the second mirror 6 constitute an image inverting unit configured to convert an object image formed on the focusing screen 4 into a non-inverted erected image.

The eyepiece lens 7 includes a first lens 7a, a second lens 7b, and a third lens 7c disposed along an optical axis in order from the second mirror 6 side to the eye-point 8 side. The first lens 7a has a negative refractive power. The second lens 7b has a positive refractive power. The third lens 7c has a negative refractive power.

The first lens 7a, which is positioned closest to the second mirror 6 among the lenses 7a to 7c, has a rotationally asymmetrical surface on the entrance surface side. The second lens 7b, being a bi-convex lens, has rotationally symmetrical surfaces on the entrance and exit surface sides. The third lens 7c, being concave at the side facing the eye-point 8, has a rotationally symmetrical surface on the exit surface side. With the above-described configuration, the eyepiece lens 7 has a sufficiently long eye relief.

An image pickup unit, such as an image sensor (e.g., a charge-coupled device (CCD) sensor or a complementary metal-oxide semiconductor (CMOS) sensor) or a film, can be disposed at an image plane 9 of the photographic lens 1.

Light having passed through the photographic lens 1 is reflected by the quick-return mirror 2. An object image (i.e., a viewfinder image) is formed on the focusing screen 4. The first mirror 5 and the second mirror 6 convert the object image formed on the focusing screen 4 into an erected image. The eyepiece lens 7 enlarges the erected image so that a user can observe an enlarged image at the eye-point 8.

In a shooting operation, to form an image on the image pickup unit, the quick return mirror 2 rotates about the rotary axis 2a so that light from the photographic lens 1 can reach the image plane 9. The image pickup unit disposed on the image plane 9 can receive light of an image corresponding to the object image formed on the focusing screen 4.

The digital single-lens reflex camera illustrated in FIG. 1 allows a user to perform diopter movement by moving the second lens 7b along the optical axis of the eyepiece lens 7.

The second mirror 6, which can have a rotationally asymmetrical surface, has a focal power so that a large viewfinder magnification can be obtained.

Light is obliquely incident on the second mirror 6. However, decentration aberration caused by such an oblique incidence can be reduced by the rotationally asymmetrical surface of the second mirror 6.

Furthermore, the entrance surface of the first lens 7a or each of the entrance and exit surfaces of the first lens 7a is a rotationally asymmetrical surface. Thus, the first lens 7a can adequately correct residual decentration aberration transmitted from the second mirror 6. In addition, light having exited the first lens 7a returns to a coaxial system. Accordingly, the digital single-lens reflex camera illustrated in FIG. 1 allows a user to perform diopter movement by moving the second lens 7b along the optical axis of the eyepiece lens 7, while maintaining higher optical performances.

The viewfinder optical system according to the present exemplary embodiment has no common optical axis in the optical system. Hence, the absolute coordinate system set in the present exemplary embodiment has the origin (point "O" illustrated in FIG. 1) on a point where the optical axis of the photographic lens 1 turned by the quick-return mirror 2 intersects with the focusing screen 4 (i.e., a matte surface). Each axis in the absolute coordinate system can be defined in the following manner.

Y axis is a straight line passing through the origin and parallel to a straight line connecting two apices of the second lens 7b, with a plus direction corresponding to a direction extending from the second lens 7b to the third lens 7c. Z axis is a straight line passing through the origin and forming an angle equal to 90° in a clockwise direction relative to the Y axis on the drawing surface of FIG. 1. X axis is a straight line passing through the origin and perpendicular to both the Z axis and the Y axis (i.e., a straight line perpendicular to the drawing surface of FIG. 1).

To express the shape of the i-th surface of a viewfinder optical system, the present exemplary embodiment sets a local coordinate system for the i-th surface.

In FIGS. 3, 5 and 7, Ri represents the i-th surface. A tilt angle of the i-th surface in the YZ plane is expressed by angle θi (°), which takes a positive value in the counterclockwise direction relative to the Z axis of the absolute coordinate system. The local coordinate system of each surface has an origin on the YZ plane. There is no tilt or shift of the surface in the XZ plane and the XY plane.

Furthermore, y axis and z axis of the local coordinate system (x, y, z) for the i-th surface incline at an angle θi relative to the absolute coordinate system (X, Y, Z) in the YZ plane.

More specifically, the z axis is a straight line passing through the origin of the local coordinate system and forming an angle θi in the counterclockwise direction relative to the Z direction of the absolute coordinate system in the YZ plane. The y axis is a straight line passing through the origin of the local coordinate system and forming 90° in the counterclockwise relative to the Z direction in the YZ plane. The x axis is a straight line passing through the origin of the local coordinate system and perpendicular to the YZ plane.

Ndi and vdi respectively represent a refractive index and an Abbe number of a medium between the i-th surface and the (i+1)-th surface. Furthermore, the present exemplary embodiment expresses a stop or an eye-point as one surface.

The viewfinder optical system can have a spherical surface, a rotationally symmetrical aspheric surface, and a rotationally asymmetrical aspheric surface. The spherical surface has a radius of curvature Ri. The radius of curvature takes a plus value when the center of curvature is in the plus side relative to the Y axis and takes a minus value when the center of curvature is in the minus side relative to the Y axis.

The shape of a spherical surface can be expressed by the following formula.

$$z=\{(x^2+y^2)/Ri\}/[1+\{1-(x^2+y^2)/Ri^2\}^{1/2}]$$

The shape of a rotationally symmetrical aspheric surface can be expressed by the following formula.

$$z=\{(x^2+y^2)/Ri\}/[1+\{1-(1+k)\cdot(x^2+y^2)/Ri^2\}^{1/2}]+ka(x^2+y^2)^2+kb(x^2+y_2)^3+kc(x^2+y^2)^6+\ldots$$

The shape of a rotationally asymmetrical aspheric surface can be expressed by the following formula.

$$A=(a+b)\cdot(y^2\cdot\cos^2 t+x^2)$$

$$B=2a\cdot b\cdot\cos t[1+\{(b-a)\cdot y\cdot\sin t/(2a\cdot b)\}+[1+\{(b-a)\cdot y\cdot\sin t/(a\cdot b)\}-\{y^2/(a\cdot b)\}-\{4a\cdot b\cdot\cos^2 t+(a+b)^2\sin^2 t\}x^2/(4a^2b^2\cos^2 t)]^{1/2}]$$

$$z=A/B+C02y^2+C11xy+C20x^2+C03y^3+C12xy^2+C21x^2y+C30x^3+C04y^4+C13xy^3+C22x^2y^2+C31x^3y+C40x^4\ldots$$

The rotationally asymmetrical surface according to numerical examples of at least one exemplary embodiment of the present invention corresponds to a spherical surface-based aspheric surface obtained when a=b=Ri and t=0 in the above formulas, according to which only the even-order terms are used and the odd-order terms are eliminated (=0) with respect to the x-related terms. Thus, the rotationally asymmetrical surface according to numerical examples of at least one exemplary embodiment of the present invention has a plane symmetrical shape with respect to the yz plane.

Furthermore, if the following conditions are satisfied, the shape can be symmetric relative to the xz plane, C03=C21=0.

Moreover, if C02=C20 and C04=C40=C22/2 are satisfied, the shape can be rotationally symmetric. When the above-described conditions are not satisfied, the shape is rotationally asymmetrical. In the numerical examples, "e-X" represents "$\times 10^{-x}$."

NUMERICAL EXAMPLE 1

| i | Yi | Zi | θi | Ndi | vdi |
|---|---|---|---|---|---|
| 1 | 0.00000 | 0.00000 | 0.0 | 1 | |
| (focusing screen (matte surface) 4) | | | | | |
| 2 | 0.00000 | 25.69341 | 18.4 | 1 | |
| (first reflection surface 5) | | | | | |
| 3 | −12.03033 | 9.61214 | 63.4 | 1 | |
| (second reflection surface 6) | | | | | |
| 4 | 11.50000 | 9.61214 | 90.0 | 1 | |
| (stop surface) | | | | | |
| 5 | 12.50000 | 9.61214 | 90.0 | 1.58306 | 30.2 |
| (first lens 7a) | | | | | |
| 6 | 14.00000 | 9.61214 | 90.0 | 1 | |
| 7 | *16.39819 | 9.61214 | 90.0 | 1.5247 | 56.2 |
| (second lens 7b) | | | | | |
| 8 | *21.79819 | 9.61214 | 90.0 | 1 | |
| 9 | 30.30000 | 9.61214 | 90.0 | 1.49171 | 57.4 |
| (third lens 7c) | | | | | |
| 10 | 35.20000 | 9.61214 | 90.0 | 1 | |
| 11 | 55.90000 | 9.61214 | 90.0 | 1 | |
| (eye-point 8) | | | | | |
| 12 | *88.52278 | 9.61214 | 90.0 | 1 | |
| (image plane) | | | | | |

*The position changes during diopter movement.

The position (Yi) during diopter movement is as follows:

| i | −1 diopter | +1 diopter | −3 diopter |
|---|---|---|---|
| 7 | 16.39819 | 18.95212 | 14.30000 |
| 8 | 21.79819 | 24.35212 | 19.70000 |
| 12 | 88.52278 | 86.52278 | 90.52278 |

Spherical Surface Shape

R6 surface R=27.03089

R8 surface R=−94.45569

R10 surface R=13.42700

Rotationally Symmetrical Aspheric Surface

R7 surface R=18.21065 K=−0.609845 Ka=−0.177408e-4 Kb=−0.227108e-7 Kc=0.329174e-10 Kd=0.932528e-13

R9 surface R=22.14712 K=2.148619 Ka=−0.149766e-4 Kb=−0.248410e-7 Kc=0.692550e-10 Kd=−0.877457e-11

Rotationally Asymmetrical Aspheric Surface

R3 surface R=10000 C20=−1.3921e-5 C02=3.0541e-3 C21=1.6787e-6 C03=3.9645e-6 C40=5.1066e-7 C22=−4.5354e-7 C04=2.0735e-7

R5 surface R=500 C20=6.4041e-3 C21=−4.3026e-6 C03=−6.5652e-5 C40=1.0741e-5 C22=2.4239e-5 C04=1.0568e-5

NUMERICAL EXAMPLE 2

| i | Yi | Zi | θi | Ndi | νdi |
|---|---|---|---|---|---|
| 1 | 0.00000 | 0.00000 | 0.0 | 1 | |
| | (focusing screen (matte surface) 4) | | | | |
| 2 | 0.00000 | 25.69341 | 18.4 | 1 | |
| | (first reflection surface 5) | | | | |
| 3 | −12.03033 | 9.61214 | 63.4 | 1 | |
| | (second reflection surface 6) | | | | |
| 4 | 11.50000 | 9.61214 | 90.0 | 1 | |
| | (stop surface) | | | | |
| 5 | 12.50000 | 9.61214 | 90.0 | 1.58306 | 30.2 |
| | (first lens 7a) | | | | |
| 6 | 14.00000 | 9.61214 | 90.0 | 1 | |
| 7 | *15.72703 | 9.61214 | 90.0 | 1.5247 | 56.2 |
| | (second lens 7b) | | | | |
| 8 | *21.12703 | 9.61214 | 90.0 | 1 | |
| 9 | 30.30000 | 9.61214 | 90.0 | 1.49171 | 57.4 |
| | (third lens 7c) | | | | |
| 10 | 35.20000 | 9.61214 | 90.0 | 1 | |
| 11 | 55.90000 | 9.61214 | 90.0 | 1 | |
| | (eye-point 8) | | | | |
| 12 | *88.52278 | 9.61214 | 90.0 | 1 | |
| | (image plane) | | | | |

*The position changes during diopter movement.

The position (Yi) during diopter movement is as follows:

| i | −1 diopter | +1 diopter | −3 diopter |
|---|---|---|---|
| 7 | 15.72703 | 17.50000 | 14.30000 |
| 8 | 21.12703 | 22.90000 | 19.70000 |
| 12 | 88.52278 | 86.52278 | 90.52278 |

Spherical Surface Shape

R6 surface R=24.34272

R8 surface R=−57.87291

R10 surface R=13.42700

Rotationally Symmetrical Aspheric Surface

R7 surface R=15.50372 K=−0.650164 Ka=−0.194380e-4 Kb=−0.303838e-7 Kc=0.643218e-10 Kd=0.255392e-12

R9 surface R=28.11166 K=2.257327 Ka=−0.141960e-4 Kb=0.102951e-6 Kc=−1.22573e-8 Kd=−0.331329e-11

Rotationally Asymmetrical Aspheric Surface

R3 surface R=8000 C20=9.2678e-5 C02=2.4273e-3 C21=8.2697e-6 C03=4.1505e-6 C40=3.1373e-7 C22=−1.7142e-7 C04=3.5592e-7

R5 surface R=1118.69034

C20=4.6812e-3 C21=−1.9401e-5 C03=−5.3073e-5 C40=9.6199e-6 C22=2.0313e-5 C04=8.2296e-6

NUMERICAL EXAMPLE 3

| i | Yi | Zi | θi | Ndi | νdi |
|---|---|---|---|---|---|
| 1 | 0.00000 | 0.00000 | 0.0 | 1 | |
| | (focusing screen (matte surface) 4) | | | | |
| 2 | 0.00000 | 25.81000 | 18.27 | 1 | |
| | (first reflection surface 5) | | | | |
| 3 | −12.03866 | 9.56441 | 63.27 | 1 | |
| | (second reflection surface 6) | | | | |
| 4 | 11.49134 | 9.56441 | 90.0 | 1 | |
| | (stop surface) | | | | |
| 5 | 11.79134 | 9.56441 | 90.0 | 1.58306 | 30.2 |
| | (first lens 7a) | | | | |
| 6 | 13.79134 | 9.56441 | 90.0 | 1 | |
| 7 | *16.39134 | 9.56441 | 90.0 | 1.5247 | 56.2 |
| | (second lens 7b) | | | | |
| 8 | *22.09134 | 9.56441 | 90.0 | 1 | |
| 9 | 25.79134 | 9.56441 | 90.0 | 1.49171 | 57.4 |
| | (third lens 7c) | | | | |
| 10 | 32.79134 | 9.56441 | 90.0 | 1 | |
| 11 | 51.49134 | 9.56441 | 90.0 | 1 | |
| | (eye-point 8) | | | | |
| 12 | *84.11412 | 9.56441 | 90.0 | 1 | |
| | (image plane) | | | | |

*The position changes during diopter movement.

The position (Yi) during diopter movement is as follows:

| i | −1 diopter | +1 diopter | −3 diopter |
|---|---|---|---|
| 7 | 16.39134 | 19.59134 | 14.29134 |
| 8 | 22.09134 | 25.39134 | 19.99134 |
| 12 | 84.11412 | 82.11412 | 86.11412 |

Spherical Surface Shape

R8 surface R=−54.99423

R10 surface R=12.50035

Rotationally Symmetrical Aspheric Surface

R7 surface R=15.76893 K=−4.653226e-1 Ka=−1.011142e-5 Kb=−2.758181e-7 Kc=2.176229e-10 Kd=4.302693e-12

R9 surface R=31.93535 K=6.015037 Ka=−4.005836e-5 Kb=2.643369e-7 Kc=−2.543233e-10 Kd=−1.938338e-11

Rotationally Asymmetrical Aspheric Surface

R3 surface R=102.3601 C20=−4.347444e-3 C02=−4.009684e-3 C21=1.001808e-5 C03=7.495401e-6 C40=2.395819e-6 C22=5.378476e-6 C04=−2.458592e-8 C41=−1.156255e-8 C23=3.336026e-8 C05=−9.584576e-9 C60=−7.943692e-9 C42=2.047953e-9 C24=−1.605592e-9 C06=1.214792e-8

R5 surface R=−335.7795 C20=1.000e-3 C02=1.00e-3 C21=−4.999978e-5 C03=−4.685844e-5 C40=1.999479e-6 C22=−5.889393e-5 C04=1.99901e-6 C41=−6.54577e-7 C23=6.74711e-7 C05=−4.994715e-7 C60=2.986377e-9 C42=−2.880527e-11 C24=−4.374077e-7 C06=−2.43567e-7

As described above, the present exemplary embodiment relates to a viewfinder optical system that has advanced optical performances and a large observation magnification, enables a user to observe a large viewfinder image, and assures a sufficiently long eye relief, and is also related to an image pickup apparatus including such a viewfinder optical system.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-159657 filed Jun. 8, 2006 and No. 2007-051575 filed Mar. 1, 2007, which are hereby incorporated by reference herein in their entirety.

What is claimed is:

1. A viewfinder optical system comprising:
    a first mirror having a roof shape configured to reflect light from an object image formed by a photographic lens towards the object image;
    a second mirror configured to reflect light reflected from the first mirror towards an observation side; and
    an eyepiece lens configured to receive light reflected from the second mirror,
    wherein the second mirror has a focal power and includes a rotationally asymmetrical surface,
    wherein the eyepiece lens includes at least one rotationally asymmetrical surface,
    wherein the eyepiece lens includes a plurality of lenses, among which a lens closest to the second mirror includes a rotationally asymmetrical surface,
    wherein the eyepiece lens includes at least one positive lens positioned at the observation side relative to the lens closest to the second mirror, and
    wherein the at least one positive lens is movable along an optical axis of the eyepiece lens to perform diopter movement.

2. The viewfinder optical system according to claim 1, wherein the eyepiece lens includes a first lens having a negative refractive power, a second lens having a positive refractive power, and a third lens having a negative refractive power, in order from the second mirror to the observation side.

3. The viewfinder optical system according to claim 2, wherein the second lens is movable along an optical axis of the eyepiece lens to perform diopter movement.

4. An image pickup apparatus comprising:
    the viewfinder optical system according to claim 1; and
    an image pickup unit.

* * * * *